US008804044B2

(12) United States Patent
Bellers et al.

(10) Patent No.: US 8,804,044 B2
(45) Date of Patent: Aug. 12, 2014

(54) TEMPORAL FALLBACK FOR HIGH FRAME RATE PICTURE RATE CONVERSION

(75) Inventors: Erwin Bellers, Fremont, CA (US); Johan G. W. M. Janssen, San Jose, CA (US)

(73) Assignee: Entropic Communications, Inc., San Diego, CA (US)

( * ) Notice: Subject to any disclaimer, the term of this patent is extended or adjusted under 35 U.S.C. 154(b) by 559 days.

(21) Appl. No.: 12/936,511

(22) PCT Filed: Mar. 6, 2009

(86) PCT No.: PCT/IB2009/050932
§ 371 (c)(1),
(2), (4) Date: Feb. 9, 2011

(87) PCT Pub. No.: WO2009/109940
PCT Pub. Date: Sep. 11, 2009

(65) Prior Publication Data
US 2011/0128448 A1    Jun. 2, 2011

Related U.S. Application Data

(60) Provisional application No. 61/034,434, filed on Mar. 6, 2008.

(51) Int. Cl.
*H04N 7/58* (2006.01)
*H04N 7/18* (2006.01)
*H04N 9/47* (2006.01)

(52) U.S. Cl.
USPC ............ 348/614; 348/648; 341/67; 345/519; 345/520

(58) Field of Classification Search
None
See application file for complete search history.

(56) References Cited

U.S. PATENT DOCUMENTS

| 5,991,883 | A | 11/1999 | Atkinson | |
|---|---|---|---|---|
| 6,650,705 | B1 * | 11/2003 | Vetro et al. | 375/240.08 |
| 2003/0156639 | A1 * | 8/2003 | Liang | 375/240.01 |

(Continued)

FOREIGN PATENT DOCUMENTS

| EP | 0 648 047 A2 | 10/1994 |
|---|---|---|
| EP | 0 946 055 A1 | 3/1998 |

(Continued)

OTHER PUBLICATIONS

PCT Search Report and Written Opinion dated Jun. 19, 2009 corresponding to the related PCT Patent Application No. IB2009/050932.

(Continued)

*Primary Examiner* — Joshua Taylor
*Assistant Examiner* — Adil Ocak
(74) *Attorney, Agent, or Firm* — Richard Bachand; Duane Morris LLP

(57) ABSTRACT

An apparatus to provide a fall-back procedure for a PRC imaging device is described. The apparatus includes a PRC controller, a system resource monitor, and a PRC setting calculator. The PRC controller outputs a stream of images at an adjustable temporal rate. The adjustable temporal rate is constrained within a range defined by a first predetermined rate and a second predetermined rate. The system resource monitor obtains a measurement of system resource utilization. The PRC setting calculator determines a setting for the PRC controller in response to the measurement of system resource utilization. Additionally, the PRC controller determines a value for the adjustable temporal rate in response to the setting.

17 Claims, 5 Drawing Sheets

(56) References Cited

U.S. PATENT DOCUMENTS

| | | | |
|---|---|---|---|
| 2003/0174769 A1* | 9/2003 | Nagumo et al. | 375/240.02 |
| 2003/0223499 A1* | 12/2003 | Routhier et al. | 375/240.25 |
| 2005/0134735 A1* | 6/2005 | Swartz | 348/554 |
| 2006/0165179 A1* | 7/2006 | Feuer et al. | 375/240.18 |
| 2007/0070221 A1* | 3/2007 | Nishi et al. | 348/241 |
| 2007/0230896 A1* | 10/2007 | Wang et al. | 386/68 |
| 2007/0273787 A1* | 11/2007 | Ogino et al. | 348/441 |

FOREIGN PATENT DOCUMENTS

| | | |
|---|---|---|
| EP | 1 359 749 A1 | 11/2003 |
| EP | 1 443 511 A2 | 11/2003 |
| EP | 1 400 108 | 3/2004 |
| WO | 02/102058 A1 | 12/2002 |
| WO | 2007/129257 A1 | 11/2007 |
| WO | 2008/014288 A2 | 1/2008 |

OTHER PUBLICATIONS

PCT International Preliminary Report on Patentability dated Sep. 7, 2010 corresponding to the related PCT Patent Application No. IB2009/050932.

* cited by examiner

TEMPORAL FALLBACK FOR HIGH FRAME RATE PICTURE RATE CONVERSION

CROSS REFERENCE TO RELATED APPLICATIONS

This application is the National Stage of International Application No. PCT/IB09/050932, filed Mar. 6, 2009, which claims priority from provisional application number 61/034,434, filed Mar. 6, 2008. Each patent application identified above is incorporated herein by reference in its entirety to provide continuity of disclosure.

BACKGROUND

Digital image displays, such as Liquid Cristal Displays (LCDs), exhibit a sample-and-hold characteristic that may cause blurring of displayed images. For example, in an LCD monitor, a pixel may be assigned to a particular light value. Unlike in a Cathode Ray Tube (CRT) display, the LCD pixel will remain at the same light value until it is reassigned by the display driver. Since digital video and film only include samples or snapshots of images, there may be a significant difference in the location of a fast-moving object between samples. In such cases, the eye will attempt to smooth the movement of the object, but blurring may occur because of the difference between the actual position of the image on the display and the perceived location on the display as a result of eye tracking.

Motion-compensated (MC) Picture Rate Conversion (PRC) techniques are conventionally used to reduce the motion blur on LCD panels and other image display devices. In essence, incoming 60 Hz video is converted to 120 Hertz (Hz) using MC PRC techniques. The increased frequency reduces the hold time on the panel by a factor of two and, therefore, reduces the motion blur. In general, such algorithms are rather demanding on system resources, such as Central Processing Unit (CPU) cycles, memory bandwidth, etc. System resource usage is of particular concern where vertical motion occurs within a scene. Since the processing resources of video display architecture are limited, these limits can be reached during MC PRC in scenes that include fast vertical motion, or other instances of resource-intensive processing. Conventional fallback procedures are typically implemented to reduce the system requirements, but balancing picture quality and resources utilization is difficult.

Typical fall back strategies mainly clip the motion vector to prevent overloading the system. Unfortunately, the clipped motion vector often produces strong artifacts within the corresponding scene. Alternatively, other conventional fall-back strategies (e.g. a non-MC interpolation technique) re-introduce the motion judder for film material. Thus, conventional fall-back strategies either introduce or re-introduce annoying artifacts in the case of video or judder in the case of film material.

SUMMARY

Embodiments of a system are described. In one embodiment, the system is configured to provide a fallback procedure for a PRC imaging device. The system includes an images source, an image controller, and an image display panel. The image controller includes a PRC controller, a system resource monitor, and a PRC setting calculator. The image source supplies a first stream of images. The PRC controller outputs a second stream of images at an adjustable temporal rate. The adjustable temporal rate is constrained within a range defined by a first predetermined rate and a second predetermined rate. The system resource monitor may obtain a measurement of system resource utilization. The PRC setting calculator determines a setting for the PRC controller in response to the measurement of system resource utilization. One example of the setting is a temporal interpolation position. Additionally, the PRC controller determines a value for the adjustable temporal rate in response to the setting. In a further embodiment, the image display panel may display the second stream of images at the adjustable temporal rate.

BRIEF DESCRIPTION OF THE DRAWINGS

Other aspects and advantages of embodiments of the present invention will become apparent from the following detailed description, taken in conjunction with the accompanying drawings, illustrated by way of example of the principles of the invention.

DETAILED DESCRIPTION

Throughout the description, similar reference numbers may be used to identify similar elements.

Figure 1:
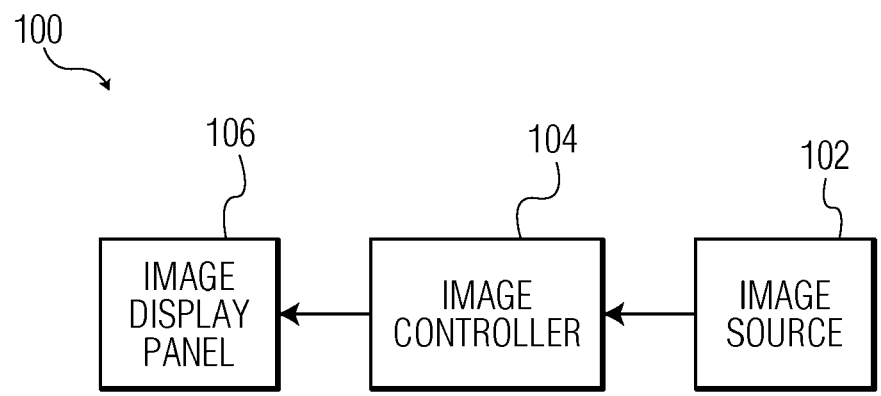
FIG. 1 depicts a schematic block diagram illustrating one embodiment of a system for temporal fallback for high frame rate picture rate conversion.

FIG. 1 depicts a schematic block diagram of one embodiment of a system 100 for temporal fallback for high frame rate picture rate conversion. In the depicted embodiment, the system 100 includes an image source 102, an image controller 104, and an image display panel 106. In certain embodiments, the image source 102, the image controller 104, and the image display panel 106 may be discrete devices, each having an individual housing. Alternatively, the image source 102, the image controller 104, and the image display panel 106 may be integrated in a single device, sharing a single housing. Other embodiments may be implemented with various alternative structural configurations.

In one embodiment, the image source 102 includes a signal receiver coupled to a remote image broadcast device (not shown). For example, the image source 102 may include an antenna receiver (not shown) configured to receive a television signal from a broadcast antenna. The image source 102 may also include a Radio Frequency (RF) receiver configured to receive a broadcast signal from a cable service provider or satellite service provider. In an alternative embodiment, the image source 102 may include a Video Cassette Recorder (VCR), a Digital Video Disk (DVD) player, or another auxiliary input device. In another alternative embodiment, the image source 102 includes a computer configured to display a Graphical User Interface (GUI) on a Video Graphics Array (VGA) connection to a computer monitor. In each of these embodiments, the image source 102 includes a receiver configured to receive images from a broadcasting device.

The image controller 104 is coupled to the image source 102. In various embodiments, the image controller 104 may convert a first image stream, from the image source 102, into a second image stream intended for the image display panel 106. For example, the image controller 104 may convert film material having a frame rate of 24 Hz into a second image stream having an adjustable temporal rate between 60 Hz and 120 Hz, or alternatively, 50 Hz and 100 Hz. As used herein, the term "temporal rate" means a rate at which images are displayed on the image display panel 106. In certain embodiments, such as progressive scan, the temporal rate may inherently include a frame conversion rate or image interleave rate. In embodiments involving Cathode Ray Tube (CRT) display panels, the temporal rate may include a refresh rate.

In a specific embodiment, the image controller 104 includes a module of a progressive scan DVD player. In an alternative embodiment, the image controller 104 is integrated into an LCD controller, a High Definition (HD) tuner, a plasma television tuner, or the like. In such embodiments, the image controller 104 performs PRC to reduce blur and remove judder in an image displayed on the image display panel 106. Further embodiments of the image controller 104 are described below with reference to FIGS. 2-4.

The image display panel 106 may be an LCD panel, a plasma display panel, a Digital Light Projection (DLP) panel, a CRT display, or another type of display device. In general, the image display panel 106 receives the second image stream from the image controller 104 and displays images from the second image stream at the adjustable temporal rate.

Figure 2:
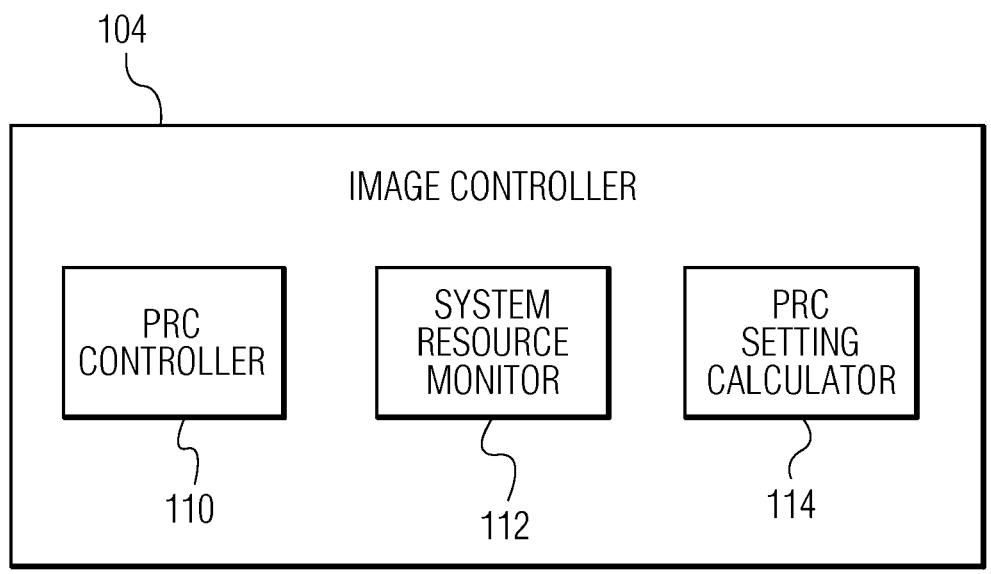
FIG. 2 depicts a schematic block diagram illustrating one embodiment of the image controller of the system of FIG. 1.

FIG. 2 depicts a schematic block diagram illustrating one embodiment of the image controller 104 of the system of FIG. 1. In the illustrated embodiment, the image controller 104 includes a PRC controller 110, a system resource monitor 112, and a PRC setting calculator 114. Other embodiments of the image controller 104 may include more or less components and implement more or less functionality.

In one embodiment, the PRC controller 110 outputs a stream of images at an adjustable temporal rate. The adjustable temporal rate may be constrained within a range of temporal rates. As one example, the adjustable temporal rate may be constrained within 60 Hz and 120 Hz. Alternatively, the adjustable temporal rate may be constrained within 50 Hz and 100 Hz or within another range of frequencies. The first temporal rate and the second temporal rate may be predetermined.

In one embodiment, the PRC controller 110 converts a first image stream into a second image stream. The conversion includes a temporal rate conversion. For example, the image source 102 may provide a first image stream to the controller 104 at a rate of 24 frames per second. The rate, in frames per second, may also be represented as an equivalent frequency of 24 Hz. The PRC controller 110 may convert the first image stream into a second image stream. An exemplary frequency of the second image stream, resulting from the conversion of the first image stream, may be 60 Hz, 120 Hz, or an adjustable temporal rate somewhere in between 60 Hz and 120 Hz. In embodiments that involve film material, this frequency may be commonly referred to as the "frame rate," and the conversion in frame rates may be referred to as the "conversion rate." In the present description both terms are included within the definition of the term "temporal rate," either directly or inherently, because both terms are included in the frequency at which images are displayed on the image display panel 106. In one embodiment, the image controller 104 may perform the conversion by interpolating additional images, or frames, to interject between the existing images. This type of conversion is commonly referred to as "picture rate conversion" (PRC).

The illustrated image controller 104 also includes a system resource monitor 112. In one embodiment, the system resource monitor 112 obtains a measurement of system resource utilization. For example, the system resource monitor 112 may obtain a measurement of CPU cycles, memory usage, or the like. In an alternative embodiment, the system resource monitor 112 also may obtain measurements of environmental factors such as temperature. The system resource monitor 112 then provides the measurement to the PRC setting calculator 114. In one embodiment, the PRC setting calculator 114 determines a setting for the PRC controller 110. In one embodiment, the setting may be calculated in response to the measurement of system resource utilization. For example, if the measurement indicates that too much of the system resources are being utilized at a temporal rate of 120 Hz, the PRC setting calculator 114 may modify the setting to cause the PRC controller 110 to reduce the adjustable temporal rate of the output image stream, to 90 Hz, for example. In one particular embodiment, the PRC setting calculator 114 adjusts the setting so that the PRC controller 110 reduces the adjustable temporal rate to 60 Hz. In such embodiments, the PRC controller 110 determines the value of the adjustable temporal rate in response to the setting provided by the PRC setting calculator 114.

In one embodiment, the setting includes a signal indicating a temporal interpolation position. The PRC setting calculator 114 communicates the signal to the PRC controller 110, for example via a wired electrical connection. Alternatively, the signal may be communicated over a metalized layer of a circuit card, or over a wireless channel using radio frequency signals, or over another communication channel using another signal communication medium. The PRC controller 110 may use the temporal interpolation position signal to perform temporal rate conversions.

Figure 3:
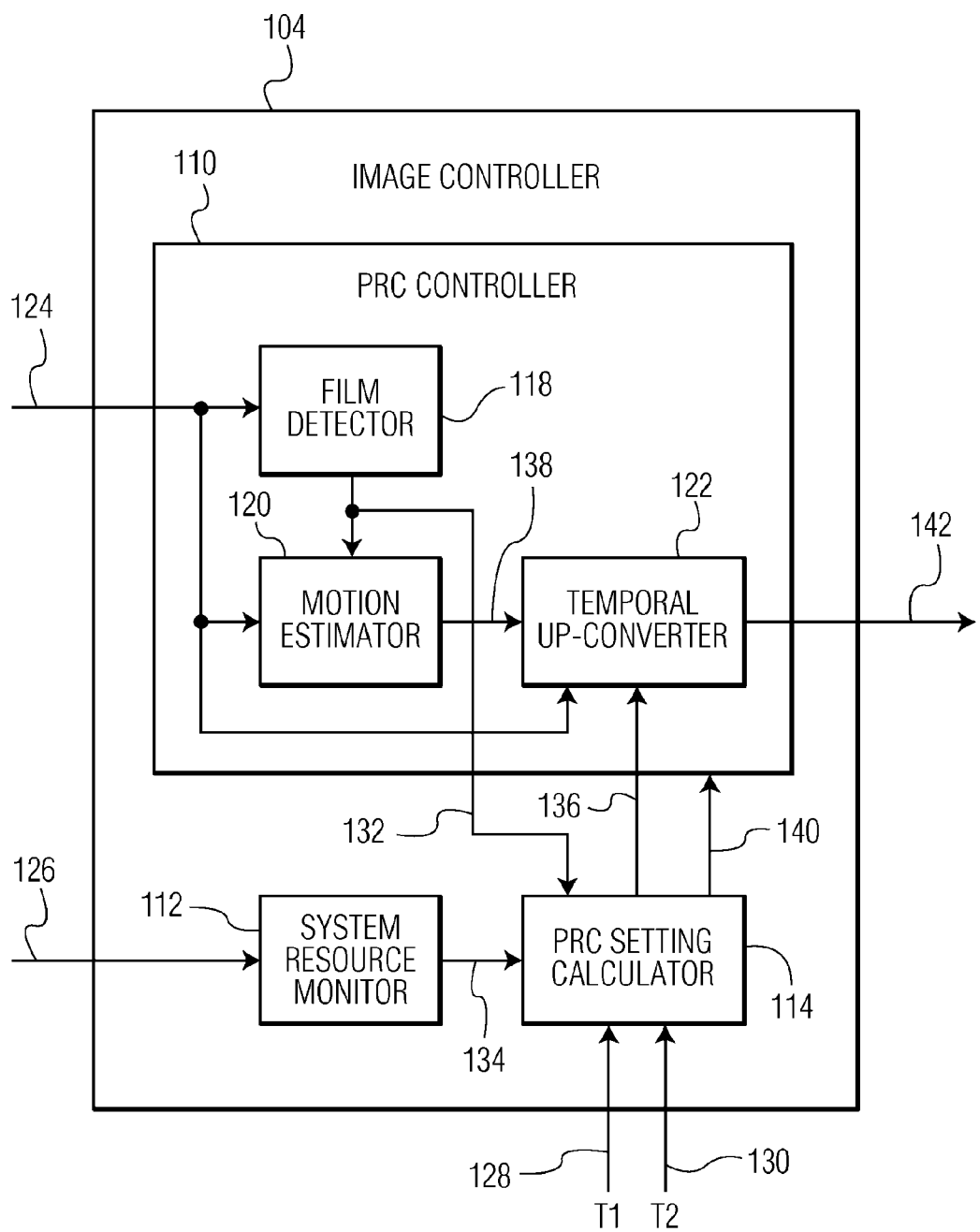
FIG. 3 depicts a schematic block diagram illustrating another embodiment of the image controller of the system of FIG. 1.

FIG. 3 depicts a schematic block diagram illustrating another embodiment of the image controller 104 of the system 100 of FIG. 1. In the depicted embodiment, the image controller 104 includes the PRC controller 110, the system resource monitor 112, and the PRC setting calculator 114 as shown in FIG. 2 and described above. Additionally, the PRC controller 110 includes a film detector 118, a motion estimator 120, and a temporal up-converter 122. The image controller 104 also includes various signal communication connections 124-142.

In a particular embodiment, the film detector 118, the motion estimator 120, and the temporal up-converter 122 each receive an image input signal via the signal communication channel 124 from the image source 102. The film detector 118 may determine whether the input signal is based on a film or another video source. The frame rate of film is typically 24 Hz, whereas the standard temporal rate of other video is 60 Hz. The film detector 118 then communicates a film detection signal via the signal communication connection 132 to the motion estimator 120 and the PRC setting calculator 114.

The motion estimator 120 may calculate an estimate of a rate of motion of objects within the images based on a cached previous image and a current image. In a further embodiment, multiple cached images may be used to estimate a rate of motion of objects. The motion estimator 120 then communicates an estimate signal 138 to the temporal up-converter 122, which uses the estimate to interpolate images to inject between the actual images received on the input signal communication connection 124.

The temporal up-converter 122 may determine an adjustable temporal rate, or rate at which images are placed in the output signal via the signal communication connection 142, based on a temporal interpolation position signal via the signal communication connection 136 from the PRC setting calculator 114. In such an embodiment, the temporal up-converter 122 generates the interpolated images based on information from the input signal 124, a cached previous image, and information from the motion estimator 120. During normal operation, the temporal up-converter 122 communicates images to an image display panel 106 at a rate of 120 Hz.

The system resource monitor 112 may obtain a measurement of system resource utilization from one or more sensor signals via the signal communication connection 126. In one embodiment, the system resource monitor 112 monitors the image controller 104. In an alternative embodiment, the system resource monitor 112 monitors external system components. The system resource monitor 112 provides a measurement signal via the signal communication connection 134 to the PRC setting calculator 114.

In a particular embodiment, the PRC setting calculator 114 determines an optimal setting for the temporal up-converter 122 based on an estimate of the system resource utilization and one or more threshold settings T1, T2. The estimate may be calculated based on the measurement 134 of system resource utilization and a prediction based on the film detection signal 132. Alternatively, the PRC setting calculator may estimate the system resource usage based on a motion estimate signal via the signal communication connection 138, an input signal via the signal communication connection 124, a cached previous image, and the measurement signal via the signal communication connection 134.

The threshold settings T1 and T2 may be set by a user or a manufacturer. In one embodiment, the first threshold setting T1 is set by a first user input signal via the signal communication connection 128, and the second threshold setting T2 is set by a second user input signal via the signal communication connection 130. If the PRC setting calculator determines that the estimated system resource utilization is above either T1 or T2, the PRC setting calculator 114 may modify a temporal interpolation position signal 136 and other setting signals via the signal communication connection 140 on the PRC controller 110 in order to reduce the adjustable temporal rate of the output signal via the signal communication connection 142 from a first predetermined rate to a second predetermined rate. For example, the adjustable temporal rate may be reduced from 120 Hz to 60 Hz.

Figure 4:
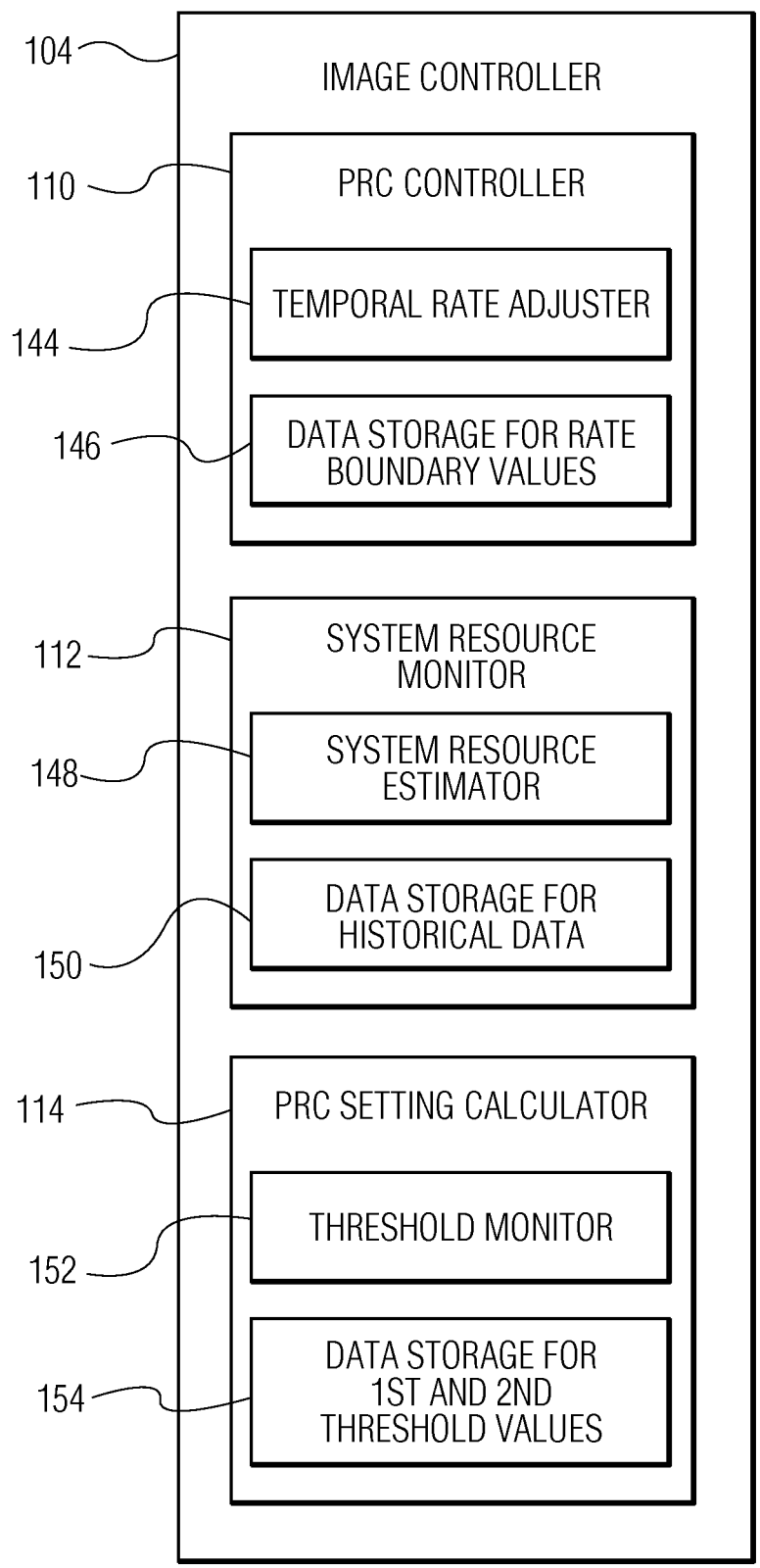
FIG. 4 depicts a schematic block diagram illustrating another embodiment of the image controller of the system of FIG. 1.

FIG. 4 depicts a schematic block diagram illustrating another embodiment of the image controller 104 of the system 100 of FIG. 1. The image controller 104 includes the PRC controller 110, the system resource monitor 112, and the PRC setting calculator 114.

Although FIGS. 2, 3 and 4 illustrate various embodiments of the image controller 104, some or all of the components and functionality described herein may be combined in one or more embodiments of the image controller 104. In the illustrated embodiment, the PRC controller 110 includes a temporal rate adjustor 144 and a data storage 146 for rate boundary values. Other embodiments may not include a separate data storage 146 for storing rate boundary values. The system resource monitor 112 may include a system resource estimator 148 and a data storage 150 for historical image data. The PRC setting calculator 114 includes a threshold monitor 152 and a data storage device 154 for the first threshold value T1 and the second threshold value T2. In alternative embodiments, the threshold monitor 152 monitors only a single threshold. Alternatively, the threshold monitor 152 may monitor a plurality of thresholds.

The temporal rate adjustor 144 may automatically adjust the adjustable temporal rate in response to the setting calculated by the PRC setting calculator 114. For example, if the PRC setting calculator 114 reduces the temporal interpolation position setting 136, the temporal rate adjustor 144 may automatically reduce the adjustable temporal rate of the second image stream, on the output signal 142.

The temporal rate adjustor 144 may reduce the adjustable temporal rate gradually or abruptly to a rate that does not fall below the second predetermined temporal rate. Alternatively, if the temporal interpolation position setting 136 is increased, the temporal rate adjustor 144 may automatically raise the adjustable temporal rate gradually or abruptly up to a value that does not exceed the first predetermined temporal rate. The temporal rate adjustor 144 may reference values corresponding to the first predetermined temporal rate and the second predetermined temporal rate to ensure that the adjustable temporal rate stays within the specified range. The predetermined temporal rate values may be stored in the data storage device 146 or another memory device. Alternatively, the values may be stored in a register, identified by a potential level across a digital logic gate or transistor, or obtained in another manner.

In one embodiment, the temporal rate adjustor 144 is implemented as an integrated circuit (IC) package. The temporal rate adjustor 144 may include one or more electrical interface contacts. One of the electrical interface contacts may be designated for receiving a temporal interpolation position signal. The temporal interpolation position signal via the signal communication connection 136 may bias certain transistors within the temporal rate adjustor 144 to electrical potential levels that cause the temporal rate adjustor 144 to output the second image stream at a temporal rate determined by the value of the temporal interpolation position signal.

As mentioned above, the system resource monitor 112 estimates system resource utilization. In one embodiment, the system resource monitor 112 includes a system resource estimator 148 to generate the estimate or to obtain a past value associated with the specific measurement values. The system resource estimator 148 may calculate the estimate of available system resources based on one or more measurements obtained by the system resource monitor 112 and/or a prediction of future system resource utilization.

In a specific embodiment, the system resource estimator 148 calculates the estimate of system resource usage based on a motion estimate signal via the signal communication connection 138, an input signal via the signal communication connection 124, a cached previous image, and the measurement signal via the signal communication connection 134. In such an embodiment, the cached previous image is stored in the data storage device 150 or another memory device.

The threshold monitor 152 may compare the measurement of system resource utilization with a first predetermined threshold T1. In such an embodiment, the threshold monitor 152 triggers the PRC setting calculator 114 to gradually reduce a value of the setting via the signal communication connection 136 in response to a determination that the system resource utilization has reached the first predetermined threshold T1. For example, the setting may be adjusted to one or more predetermined intermediate levels, such as 100 Hz, 90 Hz, 80 Hz, etc.

The temporal rate adjustor 144 may automatically reduce the adjustable temporal rate of the output signal 142 in response to the reduction in the value of the setting via the signal communication connection 136. In a particular embodiment, the temporal rate adjustor 144 may gradually reduce the adjustable temporal rate from 120 Hz to 60 Hz, for example, over a period of one second or more. The gradual reduction may include stepping down the temporal rate in one or more predetermined steps. In such an embodiment, the value for the first predetermined threshold T1 may be stored in the data storage device 154. The data storage device 154 may include a memory device, a register, or another type of data storage device. Alternatively, the data storage device 154 includes a digital value held in a digital flip-flop device, a potential level on a transistor output, or another signal state capture device.

Figure 5:
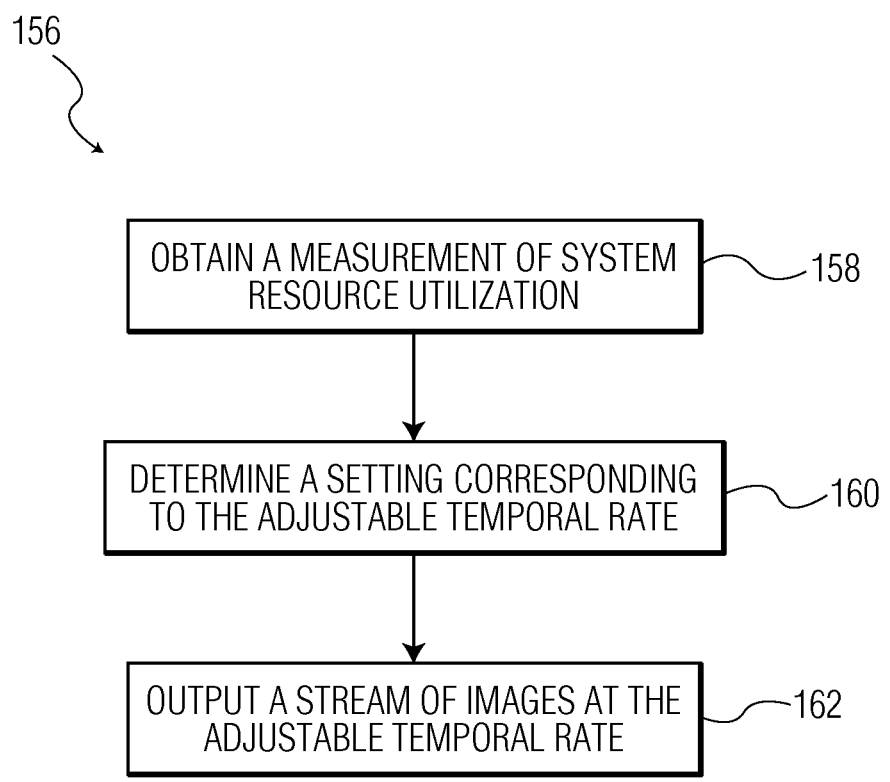
FIG. 5 depicts a schematic flowchart diagram illustrating one embodiment of a method for temporal fallback for high frame rate picture rate conversion.

In a further embodiment, the threshold monitor 152 compares the measurement of system resource utilization with a second predetermined threshold T2. In such an embodiment, the threshold monitor 152 may trigger the PRC setting calculator 114 to abruptly reduce a value of the setting 136 in response to a determination that the system resource utilization has reached the second predetermined threshold T2. In general, an abrupt change of the value of the setting 136 is effectuated quickly compared to the gradual change of the value of the setting 136, although the specific time frame may depend on system requirements and specifications. As one example, an abrupt reduction may take place within the time-frame of one cycle of the adjustable temporal rate. As another example, an abrupt deduction may take place within the time-frame of three cycles of the adjustable temporal rate. In the case of an adjustable temporal rate of 120 Hz, the abrupt reduction may take place within 1/120 of a second, or less than one hundredth of a second. Alternatively, the abrupt reduction may take place within several cycles, but still abruptly as compared with the gradual reduction. The temporal rate adjustor 144 may automatically reduce the adjustable temporal rate of the output signal 142 in response to the reduction in the value of the setting 136. In a particular embodiment, the temporal rate adjustor 144 abruptly reduces the adjustable temporal rate to 60 Hz, or another predetermined rate. FIG. 5 depicts a schematic flowchart diagram illustrating one embodiment of a method 156 for temporal fallback for high frame rate picture rate conversion. Although the temporal fallback method 156 of FIG. 5 is described in relation to the image display system 100 of FIGS. 1 and 2, other embodiments may be implemented in conjunction with other display systems.

In the depicted embodiment, at block 158, the system resource monitor 112 obtains a measurement of system resource utilization. For example, the system resource monitor 112 may receive a sensor data signal via the signal communication connection 126 from one or more resource monitoring sensors (not shown). The system resource monitor 112 may then interpret the sensor signals to obtain a system resource measurement. The system resource monitor 112 may then provide a measurement signal via the signal communication connection 134 to the PRC setting calculator 114.

At block 160, the PRC setting calculator 114 determines a setting corresponding to the adjustable temporal rate of the output signal via the signal communication connection 142. In one embodiment, the setting is a temporal interpolation position signal via the signal communication connection 136. The PRC setting calculator 114 may apply the setting to the PRC controller 110. At block 162, The PRC controller 110 then outputs a stream of images at an adjustable temporal rate. The adjustable temporal rate may correspond to the value of the setting communicated via the signal communication connection 136. In at least some embodiments, the adjustable temporal rate is the rate at which images are communicated on the signal communication connection 142 and displayed on the image display panel 106.

Figure 6:
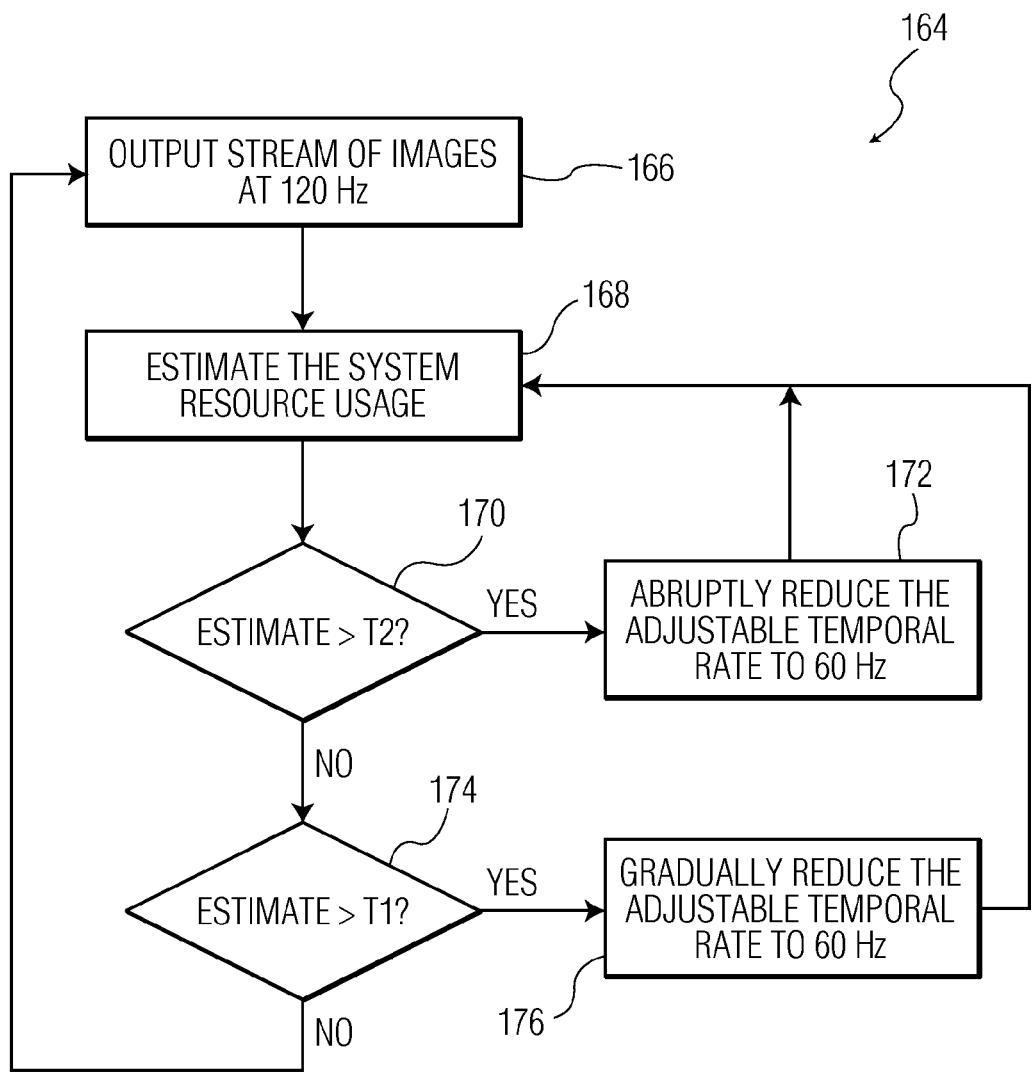
FIG. 6 depicts a schematic flowchart diagram illustrating another embodiment of a method for temporal fallback for high frame rate picture rate conversion.

FIG. 6 depicts a schematic flowchart diagram illustrating another embodiment of a method 164 for temporal fallback for high frame rate picture rate conversion. In general the method 164 relates to temporal fallback in an image display panel 106, other embodiments may be implemented in conjunction with other display devices.

In the depicted embodiment, at block 166, the temporal up-converter 122 outputs a stream of images at a frequency of 120 Hz. At block 168, the system resource estimator 148 estimates system resource utilization. At block 170, the threshold monitor 152 then determines if the estimate is greater than the second threshold T2. If the threshold monitor 152 determines that the estimate is greater than the second threshold T2, then the PRC setting calculator 114 may be triggered to abruptly reduce a value of a temporal interpolation position setting via the setting communication connection 136. At block 172, the temporal rate adjustor 144 then abruptly reduces the adjustable temporal rate to 60 Hz. The threshold monitor 152 may continue to monitor system resource estimates.

If the threshold monitor 152 determines that the estimate is not greater than the second threshold T2, then at block 174, the threshold monitor 152 determines whether the estimate is greater than the first threshold T1. If the threshold monitor 152 determines that the estimate is greater than the first threshold T1, then at block 176 the temporal rate adjustor 144 gradually reduces the adjustable temporal rate to 60 Hz.

If the threshold monitor 152 determines that the estimate is not greater than the first threshold T1, the temporal rate adjustor 144 may increase the adjustable temporal rate to 120 Hz. If the PRC controller 110 is already outputting the stream of images at 120 Hz, it may continue to do so until the threshold monitor 152 determines that a threshold T1, T2 is exceeded.

Although the described embodiments have been primarily targeted toward LCD display panels, the scope of the present description and claims are not intended to be limited only to LCD display panel applications. Additional embodiments may be implemented with plasma displays, DLP displays, projectors and projection displays and CRT monitors, and other display devices. In such embodiments, the refresh rate, or number of times the same image is displayed on the image display panel may be reduced in association with the reduction of the adjustable temporal rate. In the described embodiments, although "temporal rate" primarily refers to an image display rate, the term "temporal rate" may cover refresh rates, frame rates, frame conversion rates, and other rates which are as applicable to a rate of displaying images on an image display panel.

Additionally, although the present description includes 120 Hz and 60 Hz as exemplary values for the first temporal rate and the second temporal rate, other temporal rate ranges may be used for diverse electrical infrastructures and environments. For example, in certain European countries 100 Hz and 50 Hz may be more suitable values for the first temporal rate and the second temporal rate. Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus comprising:
   a Picture Rate Conversion (PRC) controller configured to output a stream of images at an adjustable temporal rate, wherein the adjustable temporal rate is constrained within a range defined by a first predetermined rate and a second predetermined rate;
   a system resource monitor configured to obtain a measurement of system CPU resource utilization; and
   a PRC setting calculator coupled to the system resource monitor and to the PRC controller, the PRC setting calculator configured to determine a setting for the PRC controller, wherein the setting is calculated in response to the measurement of system CPU resource utilization;
   wherein the PRC controller is further configured to determine a value for the adjustable temporal rate based on the setting; and
   wherein the system resource monitor comprises a system resource estimator configured to generate an estimate of available system CPU resources, wherein the measurement of system CPU resources utilization comprises the estimate of available system CPU resources.

2. The apparatus of claim 1, wherein the setting further comprises a temporal interpolation position, wherein the temporal interpolation position is the position of an object in picture associated with a time stamp between two neighboring pictures.

3. The apparatus of claim 1, wherein the first predetermined temporal rate is one hundred and twenty (120) Hertz (Hz) and the second predetermined temporal rate is sixty (60) Hz.

4. The apparatus of claim 1, wherein the PRC controller comprises a temporal rate adjustor configured to automatically adjust the adjustable temporal rate in response to the setting from the PRC setting calculator.

5. The apparatus of claim 4, wherein the PRC setting calculator further comprises a threshold monitor configured to compare the measurement of system CPU resource utilization with a first predetermined threshold, and to trigger the PRC setting calculator to gradually reduce a value of the setting in response to a determination that the system CPU resource utilization exceeds the first predetermined threshold, wherein the temporal rate adjustor is further configured to reduce the adjustable temporal rate in response to the reduction of the value of the setting.

6. The apparatus of claim 5, wherein the threshold monitor is further configured to compare the measurement of system CPU resource utilization with a second predetermined threshold, and to trigger the PRC setting calculator to abruptly reduce the value of the setting in response to a determination that the system CPU resource utilization exceeds the second predetermined threshold, wherein the temporal rate adjustor is further configured to reduce the adjustable temporal rate in response to the reduction of the value of the setting.

7. A system comprising:
   an image source configured to supply a first stream of images;
   an image controller in communication with the image source, the image controller comprising:
   a Picture Rate Conversion (PRC) controller configured to output a second stream of images at an adjustable temporal rate, wherein the adjustable temporal rate is constrained within a range defined by a first predetermined rate and a second predetermined rate;
   a system resource monitor configured to obtain a measurement of system CPU resource utilization; and
   a PRC setting calculator coupled to the system resource monitor and to the PRC controller, the PRC setting calculator configured to determine a setting for the PRC controller, wherein the setting is calculate base on the measurement of system CPU resource utilization;
   wherein the PRC controller is further configured to determine a value for the adjustable temporal rate based on the setting;
   wherein the system resource monitor comprises a system resource estimator configured to generate an estimate of available system CPU resources, wherein the measurement of system CPU resource utilization comprises the estimate of available system CPU resources; and
   an image display panel in communication with the image controller, the image display panel configured to display the second steam of images at the adjustable temporal rate.

8. The system of claim 7, wherein the setting further comprises a temporal interpolation position.

9. The system of claim 7, wherein the first predetermined temporal rate is one hundred and twenty (120) Hertz (Hz) and the second temporal rate is sixty (60) Hz.

10. The system of claim 7, wherein the PRC controller comprises a temporal rate adjustor configured to automatically adjust the adjustable temporal rate in response to the setting from the PRC setting calculator.

11. The system of claim 10, wherein the PRC setting calculator further comprises a threshold monitor configured to compare the measurement of system CPU resource utilization with a first predetermined threshold, and to trigger the PRC setting calculator to gradually reduce a value of the setting in response to a determination that the system CPU resource utilization exceeds the first predetermined threshold, wherein the temporal rate adjustor is further configured to reduce the adjustable temporal rate in response to the reduction of the value of the setting.

12. The system of claim 11, wherein the threshold monitor is further configured to compare the measurement of system CPU resource utilization with a second predetermined threshold, and to trigger the PRC setting calculator to abruptly reduce the value of the setting in response to a determination that the system CPU resource utilization exceeds the second predetermined threshold, wherein the temporal rate adjustor is further configured to reduce the adjustable temporal rate in response to the reduction of the value of the setting.

13. A method comprising:
   obtaining a measure of system CPU resource utilization;
   determining a setting corresponding to an adjustable temporal rate, wherein the setting is calculated based on the measurement of CPU resource utilization;
   wherein the measurement of system CPU resource utilization comprises an estimate of available system CPU resources; and
   outputting a stream of images at the adjustable temporal rate in response to the setting, wherein the adjustable temporal rate is constrained within a range defined by a first predetermined rate and a second predetermined rate.

14. The method of claim 13, wherein:
   the setting further comprises a temporal interpolation position; and
   the first predetermined temporal rate is one hundred and twenty (120) Hertz (Hz) and the second predetermined temporal rate is sixty (60) Hz.

15. The method of claim 13, further comprising automatically adjusting the adjustable temporal rate in response to a change of the setting.

16. The method of claim 15, further comprising:
comparing the measurement of system CPU resource utilization with a first predetermined threshold;
gradually reducing a value of the setting in response to a determination that the system CPU resource utilization exceeds the first predetermined threshold; and
automatically reducing the adjustable temporal rate in response to the reduction of the value of the setting.

17. The method of claim 15, further comprising:
comparing the measurement of system CPU resource utilization with a second predetermined threshold;
abruptly reducing a value of the setting in response to a determination that the system CPU resource utilization exceeds the second predetermined threshold; and
automatically reducing the adjustable temporal rate in response to the reduction of the value of the setting.

* * * * *